United States Patent [19]
Kaneko et al.

[11] Patent Number: 5,766,717
[45] Date of Patent: Jun. 16, 1998

[54] MULTILAYER OPTICAL DISK

[75] Inventors: Masahiko Kaneko, Kanagawa; Nobuhiko Umezu; Katsuhisa Aratani, both of Chiba; Ariyoshi Nakaoki, Tokyo, all of Japan

[73] Assignee: Sony Corporation, Tokyo, Japan

[21] Appl. No.: 629,564

[22] Filed: Apr. 9, 1996

[30] Foreign Application Priority Data

Apr. 11, 1995  [JP]  Japan ................................ 7-085369
Apr. 19, 1995  [JP]  Japan ................................ 7-094068

[51] Int. Cl.$^6$ ............................................ B32B 3/00
[52] U.S. Cl. ................ 428/64.1; 428/64.2; 428/64.4; 428/913; 430/495.1; 430/945; 369/283
[58] Field of Search ................ 428/64.1, 64.2, 428/64.4, 913; 369/283; 430/495.1, 945

[56] References Cited

U.S. PATENT DOCUMENTS 5,244,774  9/1993  Usami et al. ...................... 428/64.1

FOREIGN PATENT DOCUMENTS

A-0 368 442  5/1990  European Pat. Off. .
A-0 520 619  12/1992  European Pat. Off. .

*Primary Examiner*—Patrick Ryan
*Assistant Examiner*—Elizabeth Evans
*Attorney, Agent, or Firm*—Hill, Steadman & Simpson

[57] ABSTRACT

A multilayer optical disk having an information storage layer which can as well as be reproduced by a general-purpose reproducing apparatus, for example, a compact disk player, and from which information can be read from other information storage layers by using an exclusive reproducing apparatus. The multilayer optical disk having a plurality of information storage layers according to the present invention includes a plurality of information storage layers, wherein one of the plural information storage layers has a reflection factor of 70% or higher with respect to a wavelength of 770 nm to 830 nm which is a first wavelength of reproducing light, and other information storage layers are reproduced with reproducing light having a second wavelength which is different from the first wavelength of reproducing light. Each of the other information storage layers has a reflection factor of 20% or higher with respect to the second wavelength of reproducing light. The second wavelength of reproducing light is 615 nm to 655 nm.

13 Claims, 6 Drawing Sheets

MULTILAYER OPTICAL DISK

BACKGROUND OF THE INVENTION

1. Field of the Invention

The present invention relates to a multilayer optical disk having a multilayer structure consisting of a multiplicity of layers for storing information and thus capable of handling large-capacity information.

2. Related Background Art

In recent years, the prosperity of so-called multimedia results in a necessity of handling large-capacity information, such as a digital movie. Therefore, a necessity arises in that large-capacity information of the foregoing type must be stored and random-accessed so as to be reproduced, if need arises.

An optical disk is a storage medium permitting random access, exhibiting a large capacity and capable of being ejected (being removable) from a regenerating apparatus. Therefore, the optical disks have been used in a variety of fields in a large quantity. In order to enlarge the capacity as described above, one side of the optical disk must be capable of handling large-capacity information.

Under the foregoing circumstance, the capacity of the optical disk has been enlarged by a means attempted such that a multiplicity of layers for storing information are laminated in the direction of the thickness of the optical disk.

A multilayer optical disk has a multilayer structure formed on one side thereof and consisting of information layers for storing information, wherein the focal points are made to be different from one another among the multiple layers so that information is read while maintaining random access characteristic and, therefore, large-capacity information is handled by a large capacity.

Reported and representative multilayer optical disks will now be described.

1. A concept for reproducing the optical disk by making the positions of the focal points to be different from one another (refer to, for example, U.S. Pat. No. 3,946,367).
2. A method using a multilayer disk having an information layer formed by laminating a plurality of layers on one side of the disk so that information is read by means of transmitted light or reflected light (refer to, for example, U.S. Pat. No. 4,219,704).
3. A system for reproducing information from a multilayer optical disk, the system comprising an optical system having an aberration correction function (refer to U.S. Pat. No. 5,202,875).

In order to reproduce the conventional multilayer optical disk of the foregoing type, an exclusive apparatus for reproducing the optical disk is required. For example, there arises a requirement for a reproducing optical system capable of independently reproducing a reproduction signal from the first information storage layer or the second information storage layer without mixing. As an alternative to this, a signal processing system is required which is capable of distinguishing reproduction signals from the first information storage layer and the second information storage layer from each other so as to extract information without confusion.

Therefore, a reproducing apparatus, such as a compact disk player for reproducing a so-called compact disk (CD) which has been used widely as a read-only optical disk, cannot be used as it is.

OBJECT AND SUMMARY OF THE INVENTION

Accordingly, an object of the present invention is to provide a novel multilayer optical disk having an information storage layer, which can as well as be reproduced by a general-purpose reproducing apparatus, such as a compact disk player, and enabling information to be read from the other information storage layers if an exclusive reproducing apparatus is used.

In order to achieve the foregoing object, inventors of the present invention have energetically performed investigations for a long time. Thus, the spectroscopic characteristic of each information storage layer is contrived, thus resulting in that a novel multilayer optical disk being realized which is capable of detecting and reading information of an arbitrary information storage layer in accordance with the wavelengths of reproducing light and enabling a usual reproducing apparatus to read a signal supplied from any information storage layer, the usual reproducing apparatus being an apparatus which has been used widely.

That is, the multilayer optical disk according to the present invention has a structure such that the reflection factor of one of the plural information storage layers with respect to a wavelength of 770 nm to 830 nm is made to be 70% or higher and other information storage layers can be reproduced with a reproducing light beam having a wavelength different from the foregoing wavelength.

Specifically, as shown in FIG. 1 for example, a first information-storage layer 2 and a second information-storage layer 3 are formed on a substrate 1. When the outer surface of the substrate 1 is irradiated with reproducing light under the following conditions: the first information-storage layer 2 has a reflection factor R1 of 70% or higher with respect to a reproducing light beam having a wavelength of 770 nm to 830 nm; and the second information-storage layer 3 is transparent (has light transmission properties and has a low reflection factor R2) with respect to a reproducing light beam having the wavelength of 770 nm to 830 nm, and opaque (has low light transmission properties and has a high reflection factor R2) with respect to another reproducing light beam having another wavelength (a reproducing light beam having a second wavelength), only the first information-storage layer 2 can be read with the reproducing light beam having the wavelength of 770 nm to 830 nm. With the reproducing light beam having the second wavelength, only the second information-storage layer 3 or both of the first information-storage layer 2 and second information-storage layer 3 can be read. Whether the first information-storage layer 2 can be read with the reproducing light beam having the second wavelength depends upon the reflection factor R2 and the light transmission property characteristic of the second information-storage layer 3 with respect to the light beam having the second wavelength, the reflection factor R1 of the first information-storage layer 2 with respect to the light beam having the second wavelength, and the like.

The multilayer optical disk according to the present invention may, as well as the foregoing laminated structure (structure in which the information storage layers are laminated and formed on the substrate 1) employ, for example, a bonding structure. If the bonding structure is employed, image signal portions for the respective information storage layers can be formed by injection molding in place of the 2P method. Thus, an advantage can be obtained in manufacturing.

When the multilayer optical disk having the foregoing structure is manufactured, the sequential laminating order of the information storage layer (the first information-storage layer having the reflection factor of R1) having the reflection factor of 70% or higher with respect to the wavelength of 770 nm to 830 nm and the information storage layer (the second information-storage layer having the reflection factor of R2) which can be read with the second wavelength of the light beam may be determined arbitrarily. If the first information-storage layer is formed adjacent to the substrate (adjacent to the portion irradiated with the reproducing light beam), also the first information-storage layer is required to have the spectroscopic characteristic and somewhat light transmission properties with respect to the second wavelength of the reproducing beam. If the first information-storage layer is formed in the rear of the second information-storage layer, only the reflection factor with respect to the wavelength of 770 nm to 830 nm is required to be considered. Therefore, a metal film, such as an AL film, having a high reflection factor may be employed.

Since the first information-storage layer is an information storage layer having a compatibility with the compact disk, it is preferable that the first information-storage layer be formed at a position about 1.2 mm apart from the surface to be irradiated with the reproducing light beam in order to attain the optical compatibility. Therefore, when the respective information storage layers are formed on, for example, the substrate 1, it is preferable that the thickness of each information storage layer be about 1.2 mm.

On the other hand, the second information-storage layer must have the spectroscopic characteristic as described above. Therefore, for example, a dielectric multilayer film or a film having a band gap near 700 nm and made of a semiconductor laser material may be employed. The semiconductor laser material is exemplified by A1xGa(1-x)As, GaAs(1-x)Px and ZnxCd(1-x)Se.

A spacer layer for optically separating the foregoing information storage layers from one another may be formed between the respective information storage layers. It is preferable that the spacer layer be formed by a material having light transmission properties. In order to reliably perform the foregoing optical separation, it is preferable that the thickness of the spacer layer be 30 mm or thicker.

To read information signals recorded on the multilayer optical disk, a reproducing light beam having the wavelength of 780 nm is employed as the first reproducing light beam and a reproducing light beam having another wavelength is employed as the second reproducing light beam. The wavelength of the second reproducing light beam may be determined arbitrarily if the wavelength is different from that of the first reproducing light beam. To attain the foregoing selectivity, it is preferable that the wavelengths be different from each other to a certain extent. If an advantage is required in practical use, it is preferable that a reproducing light beam having a wavelength of about 635±20 nm be employed. In the case where the second reproducing light beam is used to read information signals from both of the first information-storage layer and second information-storage layer, the positions of the focal points of the information storage layers are required to be made to be different from one another so as to read the information signals from the respective information storage layers.

The multilayer optical disk according to the present invention comprising the plural information storage layers has a structure such that one of the information storage layers has the reflection factor of 70% or higher with respect to the wavelength of 770 nm to 830 nm which is the first wavelength of the reproducing light beam.

Therefore, the foregoing information storage layer has a compatibility with so-called compact disks (music compact disks and ROM disks for computers, that is, CD-ROMs).

Also the information signals recorded on the foregoing information storage layer can be reproduced by a reproducing apparatus, such as a compact disk player.

On the other hand, the second wavelength of the reproducing beam which is different from the first wavelength of the reproducing beam is able to reproduce information signals recorded on only the second information-storage layer or information signals from both of the first information-storage layer and second information-storage layer.

That is, according to the present invention, information from the first information-storage layer and second information-storage layer can be selected by changing the wavelength of the reproducing light beam so that information is stored in a large capacity.

DESCRIPTION OF THE PREFERRED EMBODIMENTS

Preferred embodiments of the present invention will now be described in detail with reference to the drawings.

First Embodiment

Figure 1:
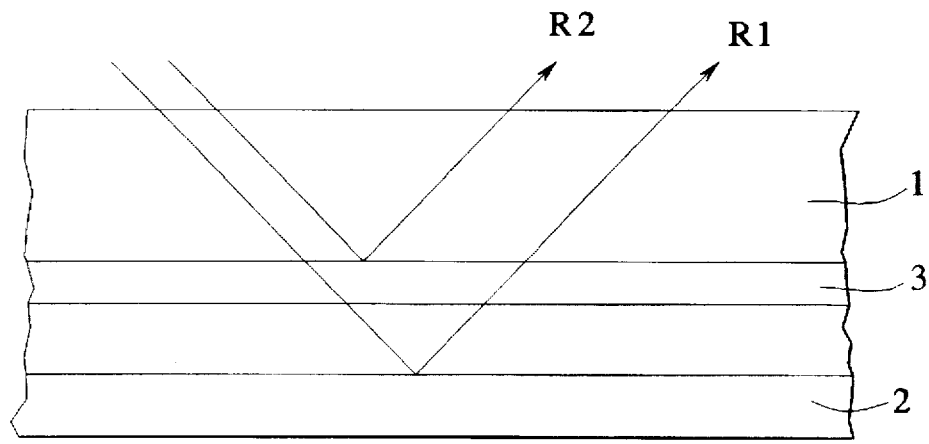
FIG. 1 is a schematic view showing the basic structure of a multilayer optical disk according to the present invention.
Figure 2:
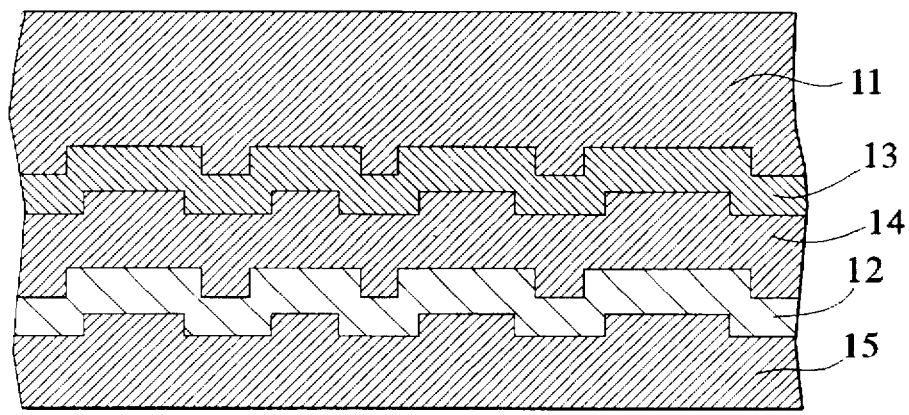
FIG. 2 is a schematic cross sectional view showing essential portions of an example of the structure of the multilayer optical disk according to the present invention.

As shown in FIG. 2, a multilayer optical disk according to this embodiment has a structure such that a second information-storage layer 13, a spacer layer 14 and a first information-storage layer 12 are, in this sequential order, formed on a substrate 11.

The substrate 11 is made of, for example, polycarbonate or glass. If the substrate 11 is made of polycarbonate, a so called 2P method is employed in such a manner that a projection and pit pattern, such as recording pits, is formed as information to be exclusively reproduced. In this embodiment, a polycarbonate substrate having a thickness of 1.2 mm and made by injection molding is employed.

The second information-storage layer 13 is formed along the projection and pit pattern of the substrate 11 to reflect a portion of light beams made incident upon the substrate 11 and permit a portion of the light beam to transmit therethrough. Thus, the second information-storage layer 13 serves as a reflecting film for reading information in the form of the projection and pit pattern to be exclusively reproduced.

The spacer layer 14 is formed to optically separate the second information-storage layer 13 and the first information-storage layer 12 from each other. Therefore, the spacer layer 14 must have a certain thickness. Specifically, it is preferable that the spacer layer 14 be 30 mm or thicker. If the spacer layer 14 is too thin, light reflected by the first information-storage layer 12 and that reflected by the second information-storage layer 13 cannot sufficiently be separated from each other and, therefore, accurate detection cannot easily be performed. If the spacer layer 14 is too thick, spherical aberration and the like take place. Therefore, the thickness must be determined appropriately to prevent the foregoing problems.

The first information-storage layer 12 formed on the second information-storage layer 13 through the spacer layer 14 is made of a material having a high reflection factor. The reflection factor of the first information-storage layer 12 is 70% or higher with respect to the wavelength of 770 nm to 830 nm.

To manufacture the foregoing multilayer optical disk, the substrate 11 is prepared initially, the substrate 11 having the projection and pit pattern, such as pits, formed to correspond to information signals to be read from the second information-storage layer 13. The substrate 11 may be made of either glass or plastic such as polycarbonate plastic. In the case where the glass substrate is employed, a so-called 2P (Photo Polymerization) method or the like is performed with which photosetting resin is enclosed between the glass substrate and a disk stamper, and then the photosetting resin is irradiated with light from a position on the outside of the glass substrate so that the projection and pit pattern is formed. Also in the case of the plastic substrate, the projection and pit pattern may be formed by the 2P method. However, an injection molding method using a stamper is generally employed to form the projection and pit pattern.

The second information-storage layer 13 is, on the substrate 11, formed by a vacuum evaporation method or a sputtering method.

Then, the spacer layer 14 is formed on the second information-storage layer 13. Since the spacer layer 14 must have a certain thickness, for example, a thickness of 30 μm or more, the spacer layer 14 is formed by applying ultraviolet-curing resin or the like by a spin coating method. The spacer layer 14 may be formed into a laminated shape by plural times of the laminating processes in each of which a layer having a thickness of μm to 10 μm is formed. The spacer layer 14 may be formed by bonding a transparent sheet.

Also the spacer layer 14 must have pits or the like formed to correspond to the information signals to be recorded on the first information-storage layer 12. The foregoing pits can be formed by the 2P method similar to the foregoing projection and pit pattern.

After the spacer layer 14 has been formed, the first information-storage layer 12 is formed on the spacer layer 14. Then, if necessary, a protective film 15 is formed by ultraviolet-curing resin or the like.

In this embodiment, the second information-storage layer 13 on the substrate 11 is in the form of a five-layer structure film consisting of Si3N4/SiO2/Si3N4/ SiO2/Si3N4 layers. The five layers respectively have thicknesses of 64 nm/90 nm/64 nm/90 nm/64 nm.

The refractive index n of Si3N4 is 2.0 and the extinction coefficient k of the same is 0, while the refractive index n of SiO2 is 1.5 and the extinction coefficient k of the same is 0. As a matter of course, materials having similar optical characteristics may be employed to obtain a similar characteristic.

The first information-storage layer 12 is an Al film having a thickness of 100 nm.

Figure 3:
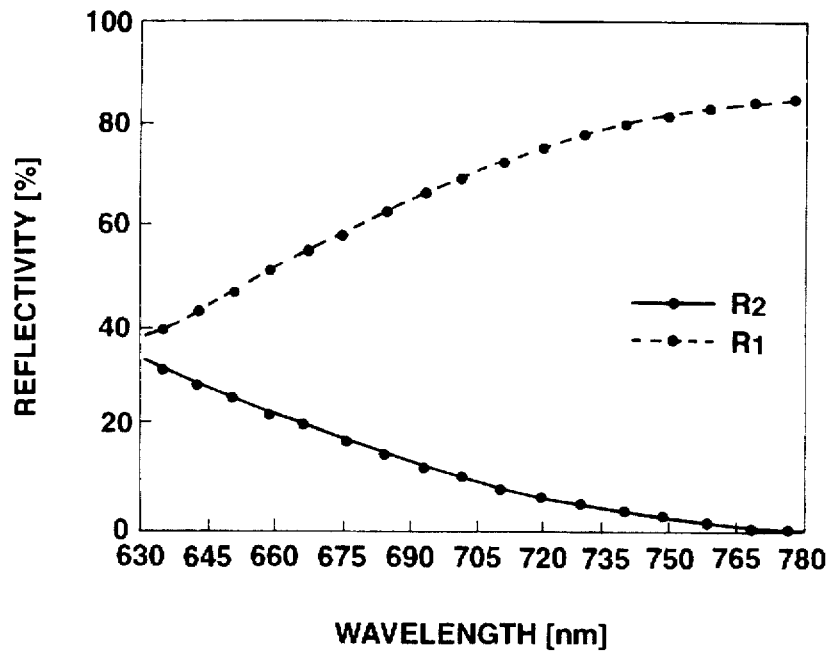
FIG. 3 is a graph showing the spectroscopic characteristic of the reflection factor of the multilayer optical disk shown in FIG. 2.

In the thus-structured multilayer optical disk, the reflection factor R2 of the second information-storage layer 13 (the five-layer structure film) has a spectroscopic characteristic as shown in FIG. 3 such that the reflection factor R2 is 34% with respect to light having a wavelength of 635 nm; and the reflection factor R2 is substantially zero with respect to light having the wavelength of 780 nm. That is, the second information-storage layer 13 has somewhat refractivity with respect to light having the wavelength of 635 nm and permits light having the wavelength of 780 nm to substantially transmit therethrough.

On the other hand, the first information-storage layer 12 (the Al film) has a reflection factor of 80% or higher with respect to both of light beams which have penetrated the second information-storage layer 13. Therefore, the reflection factor R1 of the first information-storage layer 12 with respect to the reproducing light beam is about 84% with respect to light having the wavelength of 780 nm which substantially penetrates the second information-storage layer 13 and about 38% with respect to light having the wavelength of 635 nm which has somewhat penetrated the second information-storage layer 13.

With the multilayer optical disk having the foregoing structure, use of the reproducing light beam having the wavelength of 780 nm enables reflected light to be obtained from only the first information-storage layer 12 so that information signals recorded on the first information-storage layer 12 are read. Since the reproducing light beam having the wavelength of 780 nm is used in the compact disk player and the like, the information signals recorded on the first information-storage layer 12 can as well as be reproduced by the foregoing general-purpose reproducing apparatus.

Since both of the first information-storage layer 12 and the second information-storage layer 13 have the reflection factor of about 30% with respect to the reproducing light beam having the wavelength of 635 nm, information signals can be obtained from the two layers 12 and 13. Thus, the positions of the focal points of the reproducing light beams are made to be different from each other so that information is read from both of the first information-storage layer 12 and the second information-storage layer 13.

Second Embodiment

A multilayer optical disk was manufactured which comprised a second information-storage layer 13 in the form of a triple-layer structure film and other layers respectively having structures similar to those of the first embodiment. Note that the second information-storage layer 13 was in the form of a triple-layer structure film, the triple layers respectively being made of SixN(1-x)(n=2.8 and k=0)/Si3N4 (n=2 and k=0)/SixN(1-x)(n=2.8 and k=0). The thicknesses of the respective layers were 40 nm/73 nm/40 nm.

Figure 4:
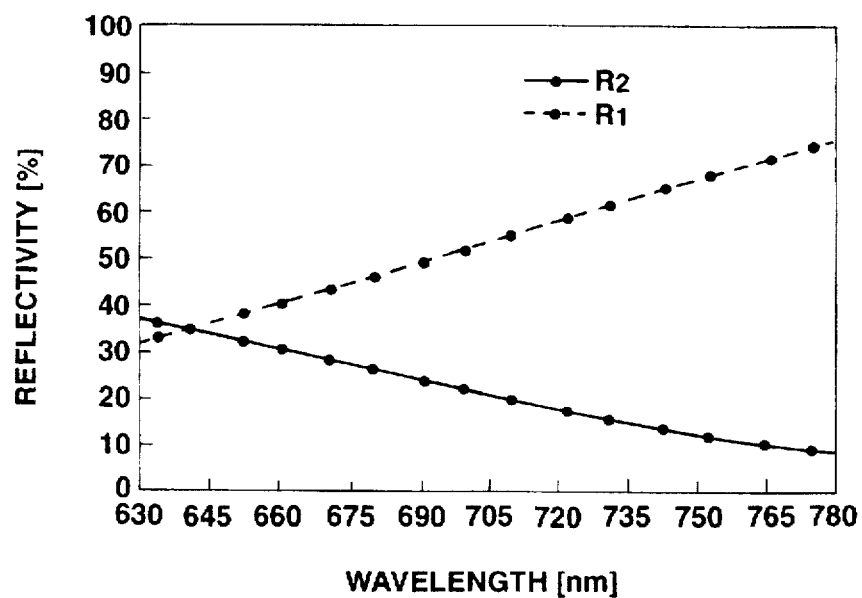
FIG. 4 is a graph showing the spectroscopic characteristic of the reflection factor of a multilayer optical disk having a second information-storage layer formed into a triple-layer structure.

Also in this embodiment, the reflection factor R1 of the first information-storage layer 12 and the reflection factor R2 of the second information-storage layer 13 have the spectroscopic characteristics as shown in FIG. 4. With the reproducing light beam having the wavelength of 780 nm, only the information signals recorded on the first information-storage layer 12 can be read. With the reproducing light beam having the wavelength of 635 nm, information signals can be read from both of the first information-storage layer 12 and the second information-storage layer 13.

Third Embodiment

In this embodiment, the second information-storage layer 13 is made of AlxGa(1-x)As which is a semiconductor laser material and which has a thickness of 120 nm.

The first information-storage layer 12 is an Al film having a thickness of 100 nm. The other structures are the same as those according to the first embodiment.

Figure 5:
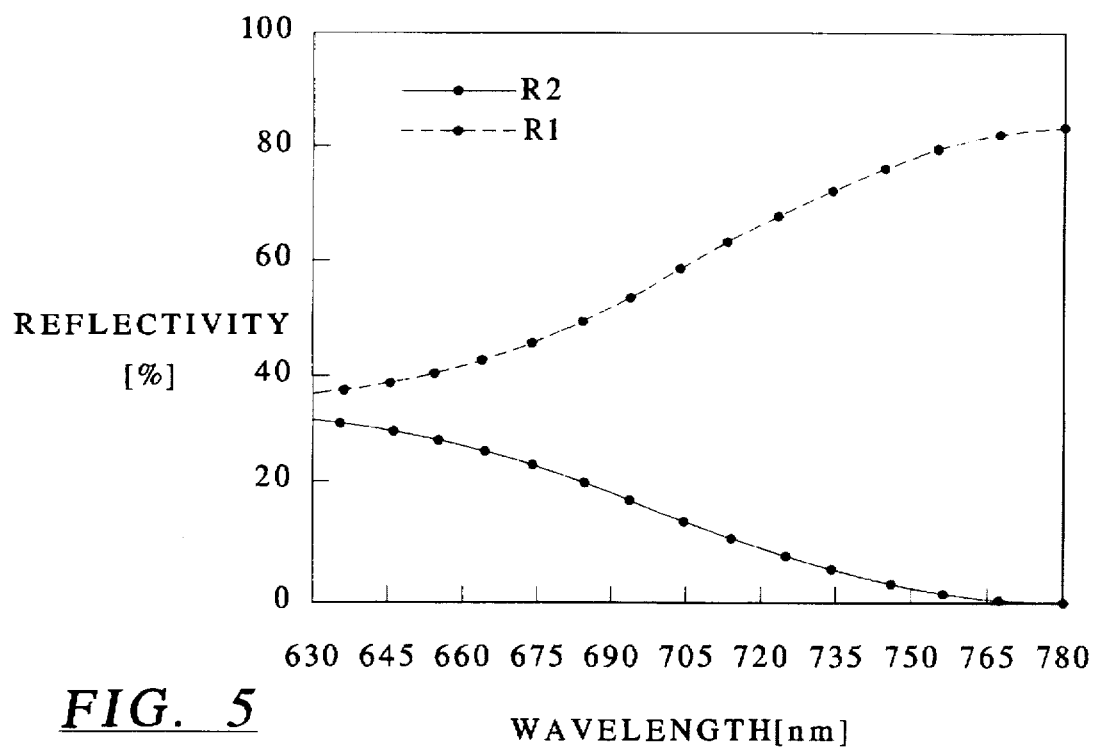
FIG. 5 is a graph showing the spectroscopic characteristic of the reflection factor of a multilayer optical disk having a second information-storage layer formed into a semiconductor layer material film.

In the multilayer optical disk structured as described above, the reflection factor R2 of the second information-storage layer 13 has a spectroscopic characteristic as shown in FIG. 5 such that the reflection factor is about 32% with respect to light having the wavelength of 635 nm and substantially zero with respect to light having the wavelength of 780 nm. That is, the second information-storage layer 13 has somewhat refractivity with respect to light having the wavelength of 635 nm and permits light having the wavelength of 780 nm to substantially transmit therethrough.

On the other hand, the first information-storage layer 12 (the Al film) has a reflection factor of 80% or higher with respect to both of the light beams which have penetrated the second information-storage layer 13. Therefore, the reflection factor R1 of the first information-storage layer 12 with respect to light having the wavelength of 780 nm which substantially penetrates the second information-storage layer 13 is about 84% and the reflection factor R1 is about 36% with respect to light having the wavelength of 635 nm which has substantially penetrated the second information-storage layer 13.

With the multilayer optical disk having the foregoing structure, use of the reproducing light beam having the wavelength of 780 nm enables reflected light to be obtained from only the first information-storage layer 12 so that information signals are read from only the first information-storage layer 12. On the other hand, since both of the first information-storage layer 12 and the second information-storage layer 13 have the reflection factor of 30% or higher with respect to the reproducing light beam having the wavelength of 635 nm, information signals can be obtained from both of the layers 12 and 13. By making the positions of the focal points of the reproducing light beams to be different from each other, information can be read from the two layers 12 and 13.

Fourth Embodiment

Figure 6:
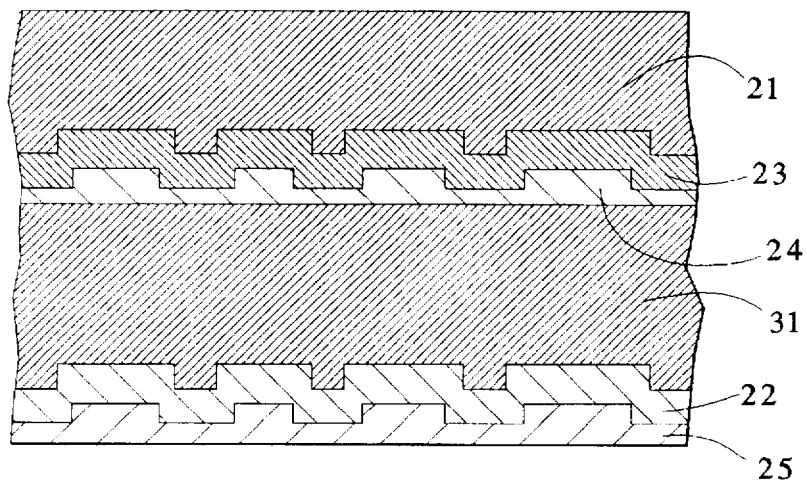
FIG. 6 is a schematic cross sectional view showing essential portions of an example of a multilayer optical disk having a structure comprising two substrates bonded to each other.

As shown in FIG. 6, this embodiment has a structure such that a second information-storage layer 23 is formed on a substrate 21 having a thickness of 0.6 mm; and a first information-storage layer 22 is formed on a second substrate 31 having a thickness of 0.6 mm, the two substrates 21 and 31 being then bonded to each other through a bonding adhesive layer 24 having light transmission properties. Thus, a multilayer optical disk according to this embodiment is constituted.

Each of the substrates 21 and 31 is a polycarbonate substrate obtained by injection molding or a glass substrate manufactured by the 2P method. The structures of the information storage layers 22 and 23 are similar to those according to the first embodiment. A protective film 25 is formed on the first information-storage layer 22.

Also with the multilayer optical disk having the foregoing structure, similar to the first embodiment, reflected light was obtained from only the first information-storage layer 22 with respect to the reproducing light beam having the wavelength of 780 nm. With respect to the reproducing light beam having the wavelength of 635 nm, reflected light was obtained from the first information-storage layer 22 and the second information-storage layer 23.

This embodiment may have another structure formed such that the first substrate and the second substrate are bonded to each other with the bonding adhesive layer 24 in such a manner that the first information-storage layer 22 and the second information-storage layer 23 face each other.

Fifth Embodiment

Figure 7:
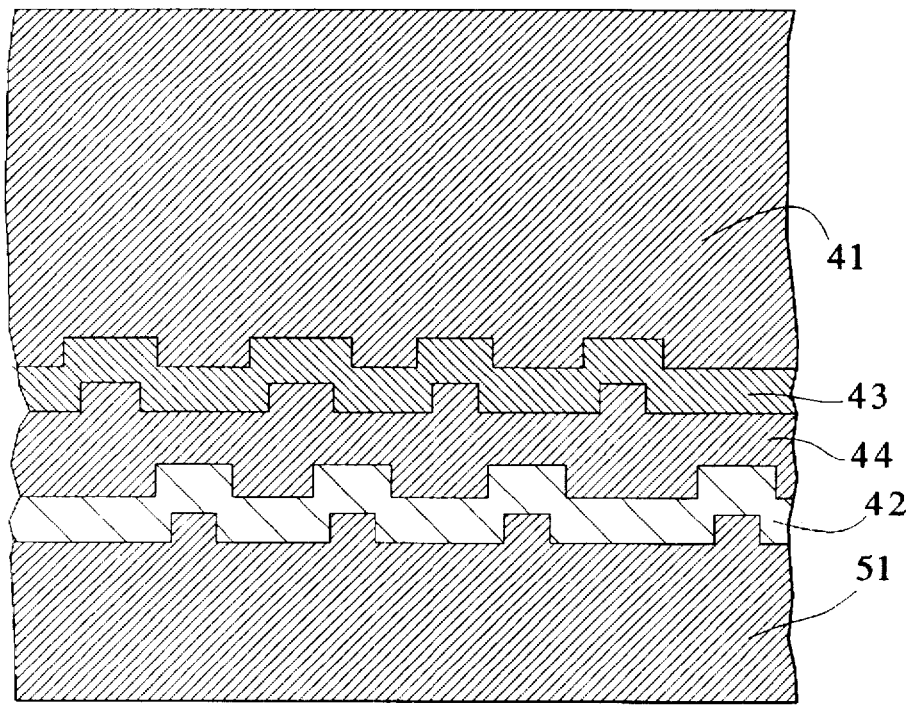
FIG. 7 is a schematic cross sectional view showing essential portions of another example of the multilayer optical disk having a structure comprising two substrates bonded to each other.

As shown in FIG. 7, this embodiment has a structure arranged such that a second information-storage layer 43 is formed on a first substrate 41 having a thickness of 1.2 mm, a first information-storage layer 42 is formed on a second substrate 51 having a thickness of 0.6 mm, and the first and second substrates 41 and 51 are, by a bonding adhesive layer 44, bonded to each other in such a manner that the information-storage layers 42 and 43 face each other.

Each of the substrates 41 and 51 is a polycarbonate substrate formed by injection molding. The structure of each of the information storage layers 42 and 43 is similar to that of the first embodiment.

Also with the multilayer optical disk having the foregoing structure, similar to the first embodiment, reflected light was obtained from only the first information-storage layer 42 with respect to the reproducing light beam having the wavelength of 780 nm. With respect to the reproducing light beam having the wavelength of 635 nm, reflected light was obtained from both of the first information-storage layer 42 and second information-storage layer 43.

Since this embodiment has the structure such that the first information-storage layer 42 and the second information-storage layer 43 are formed on the corresponding substrates 41 and 51, which are the polycarbonate substrates obtained by injection molding, a technique, such as the 2P method, is not required. Therefore, the multilayer optical disk according to this embodiment can significantly easily be manufactured.

Sixth Embodiment

Figure 8:
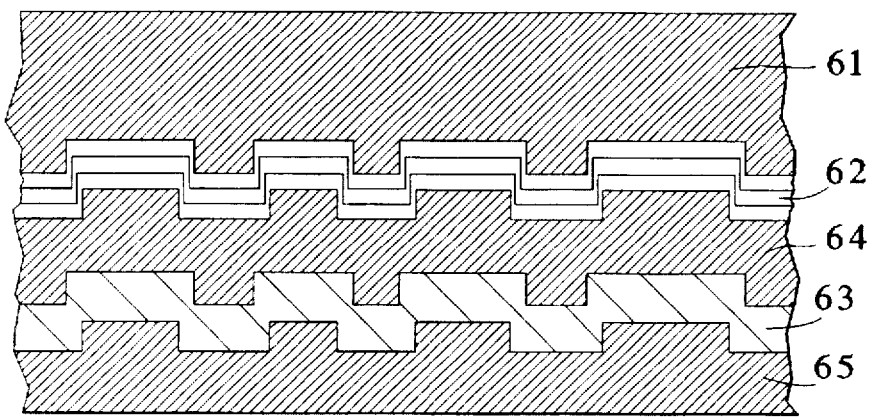
FIG. 8 is a schematic cross sectional view showing essential portions of a multilayer optical disk having a first information-storage layer formed adjacent to the substrate and formed by a triple-layer structure film.

As shown in FIG. 8, this embodiment has the structure arranged such that a first information-storage layer 62 was formed adjacent to a substrate 61, and then a second information-storage layer 63 was formed on the first information-storage layer 62 through a spacer layer 64.

The first information-storage layer 62 consists of three layers which respectively are made of SixN(1-x)(n=3.5 and k=0)/SiO2(n=1.5 and k=0)/SixN(1-x)(n=3.5 and k=0) respectively having thicknesses of 45 nm/195 nm/45 nm.

The second information-storage layer was an Al film.

Figure 9:
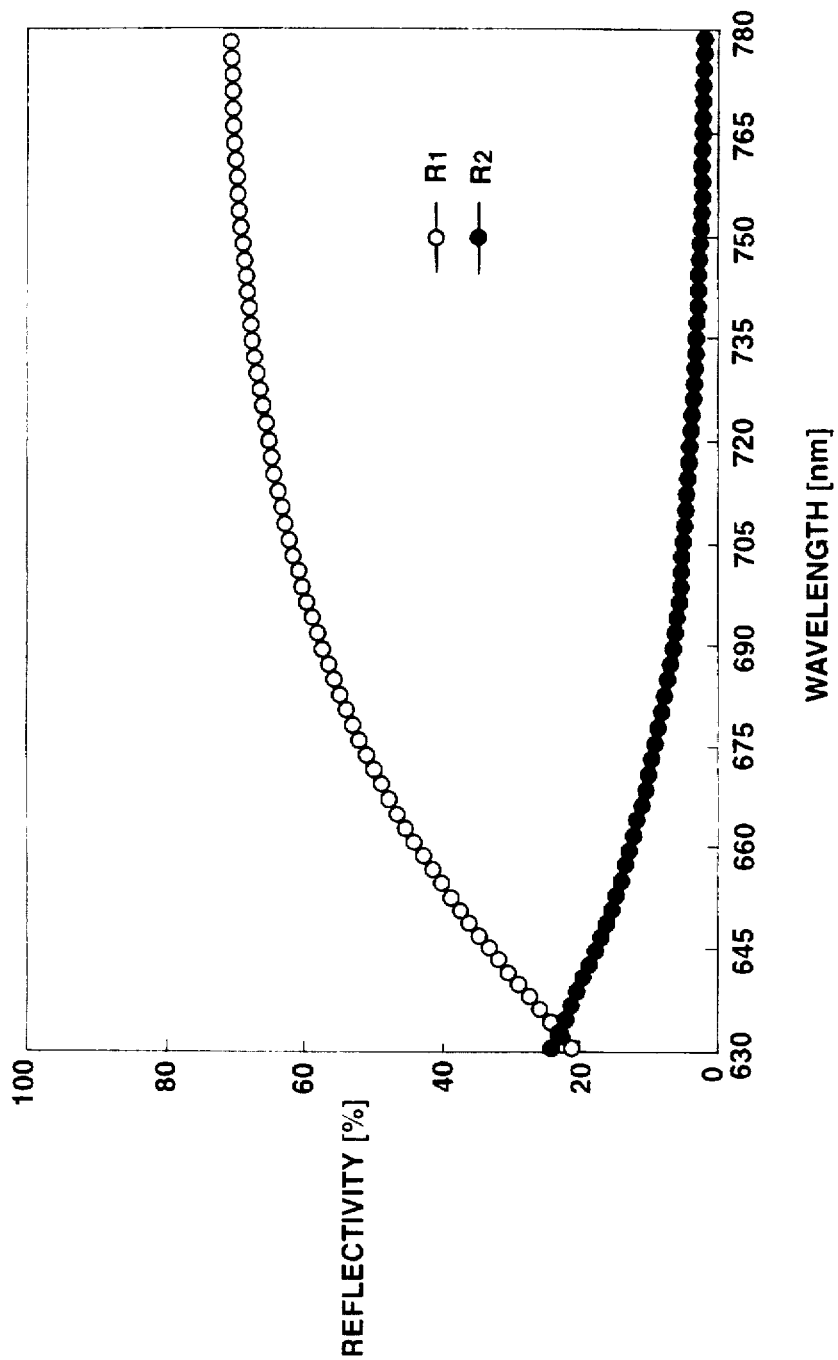
FIG. 9 is a graph showing the spectroscopic characteristic of the reflection factor of the multilayer optical disk shown in FIG. 7.

Also the multilayer optical disk having the foregoing structure enabled a spectroscopic characteristic of the reflection factor as shown in FIG. 9 to be obtained. With respect to the reproducing light beam having the wavelength of 780 nm, reflected light was obtained from only the first information-storage layer 62 as indicated by symbol R1 shown in FIG. 9. With respect to the reproducing light beam having the wavelength of 635 nm, the first information-storage layer had the light transmission properties so that reflected light was obtained from the second information-storage layer 63 as indicated by symbol R2 shown in FIG. 9.

Comparative Example

A multilayer optical disk was manufactured which comprised a Si films each having a thickness of 14 nm, the Si films being formed into the first and second information storage layers. Then, the spectroscopic characteristic of the reflection factor of each Si film was measured.

Figure 10:
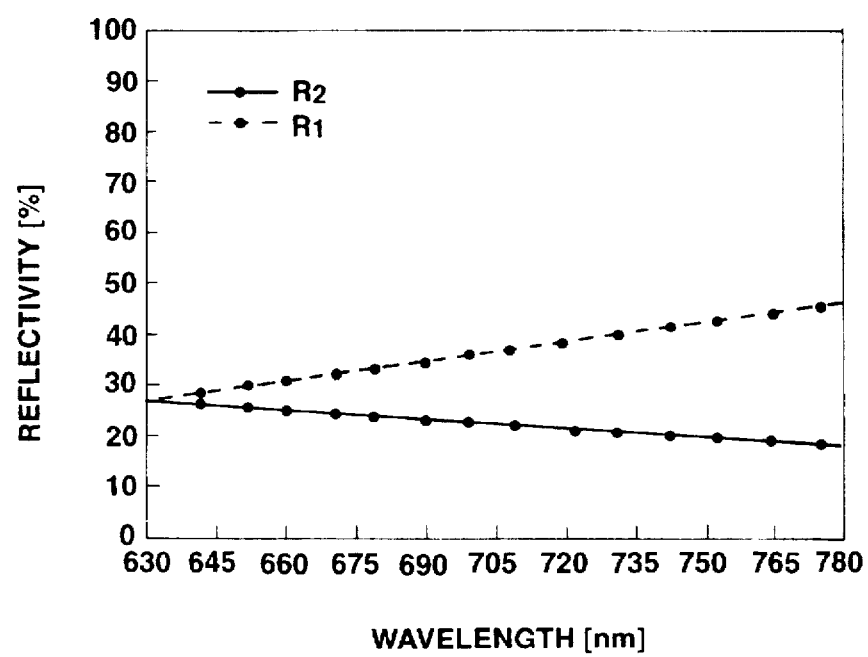
FIG. 10 is a graph showing the spectroscopic characteristic of the reflection factor of a multilayer optical disk having two information storage layers which are Si films.

As a result, the reflection factor of each Si layer had no dependency upon the wavelength as shown in FIG. 10. Since the reflection factor is, in particular, low with respect to light having the wavelength of 780 nm, the compatibility with the compact disk and the like cannot be maintained.

Note that the present invention has the structure such that the information storage layer corresponding to the light beam having the wavelength of 780 nm is formed in a CD format that can be reproduced by a compact disk player. On the other hand, the information storage layer corresponding to only the light beam having the wavelength of 635 nm is recorded at a density higher than, for example, that of the CD format.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A multilayer optical disk comprising:

a plurality of information storage layers, wherein one of said plurality of information storage layers has a reflection factor of 70% or higher with respect to a wavelength of 770 nm to 830 mn which is a first wavelength of reproducing light;

other information storage layers reproduced with reproducing light having a second wavelength which is different from said first wavelength of reproducing light; and wherein each of said other information storage layers has a reflection factor of 20% or higher with respect to said second wavelength of reproducing light.

2. A multilayer optical disk according to claim 1, wherein said second wavelength of reproducing light is 615 nm to 655 nm.

3. A multilayer optical disk according to claim 1, wherein a first information-storage layer which is reproduced with reproducing light having said first wavelength and a second information-storage layer which is reproduced with reproducing light having said second wavelength are formed on a substrate.

4. A multilayer optical disk according to claim 1, wherein a first substrate on which a first information-storage layer is formed which is reproduced with reproducing light having said first wavelength and a second substrate on which a second information-storage layer is formed which is reproduced with reproducing light having said second wavelength are bonded to each other.

5. A multilayer optical disk according to claim 3 or 4, wherein both of an information signal recorded on said first information-storage layer and an information signal recorded on said second information-storage layer are reproduced with reproducing light having said second wavelength.

6. A multilayer optical disk according to claim 3 or 4, wherein only an information signal recorded on said second information-storage layer is reproduced with reproducing light having said second wavelength.

7. A multilayer optical disk according to claim 3 or 4, wherein said second information-storage layer is formed by a dielectric multilayer film.

8. A multilayer optical disk according to claim 3 or 4, wherein said second information-storage layer is made of a semiconductor material having a band gap near a wavelength of 700 nm.

9. A multilayer optical disk according to claim 3, wherein said first information-storage layer and said second information-storage layer are laminated through a spacer layer having light transmission properties.

10. A multilayer optical disk according to claim 3, wherein said first information-storage layer and said second information-storage layer are, in this sequential order, laminated on said substrate.

11. A multilayer optical disk according to claim 3, wherein said second information-storage layer and said first information-storage layer are, in this sequential order, laminated on said substrate.

12. A multilayer optical disk comprising a plurality of information storage layers on a substrate, said plurality of information storage layers comprising a first information storage layer capable of transmitting one part of a first light beam having a wavelength of 615 to 655 nm and reflecting another part of said first light beam;

a light-transmitting layer formed on said first information storage layer; and a second information storage layer formed on said light-transmitting layer and having a reflection factor of 70% or higher with respect to a second light beam having a wavelength of 770 nm to 830 nm.

13. A multilayer optical disk according to claim 12, wherein said first information storage layer contains SiN.

* * * * *